United States Patent [19]

Bergeron

[11] Patent Number: 5,370,003
[45] Date of Patent: Dec. 6, 1994

[54] DYNAMOMETER TORQUE ARM AND DYNAMOMETER ASSEMBLY

[75] Inventor: Robert M. Bergeron, Whithers Grove, N.H.

[73] Assignee: Land & Sea, Inc., North Salem, N.H.

[21] Appl. No.: 6,505

[22] Filed: Jan. 21, 1993

[51] Int. Cl.$^5$ .............................................. G01L 1/22
[52] U.S. Cl. ............................. 73/862.338; 73/117.3
[58] Field of Search .......... 73/862.09, 862.14, 862.338, 73/862.541, 117.3, 117, 126

[56] References Cited

U.S. PATENT DOCUMENTS

| | | | |
|---|---|---|---|
| 1,107,619 | 8/1914 | Kuhner | 73/117 |
| 1,650,504 | 11/1927 | Frost | 73/117 |
| 2,287,084 | 6/1942 | Bennett | 73/117 |
| 2,597,450 | 5/1952 | Cline | 73/862.14 |
| 2,689,476 | 9/1954 | Van Ornum | 73/862.14 |
| 2,870,875 | 1/1959 | Lune | 73/117 |
| 3,289,471 | 12/1966 | Maxwell | 73/117 |
| 3,345,865 | 10/1967 | Ostrander | 73/117 |
| 3,383,910 | 5/1968 | Tanaka | 73/862.14 |
| 3,722,269 | 3/1973 | Gunnell et al. | 73/126 X |
| 3,765,232 | 10/1973 | Pelta | 73/117 |
| 3,940,978 | 3/1976 | Akkerman et al. | 73/117 |
| 3,969,931 | 7/1976 | Lanning | 73/117.1 |
| 4,179,923 | 12/1979 | Dodt | 73/862.09 |
| 4,185,495 | 1/1980 | Raunch et al. | 73/126 |
| 4,246,779 | 1/1981 | Leone, Sr. | 73/862.09 |
| 4,718,286 | 1/1988 | Eller | 73/862.14 |

Primary Examiner—Herbert Goldstein
Assistant Examiner—Elizabeth L. Dougherty
Attorney, Agent, or Firm—Davis, Bujold & Streck

[57] ABSTRACT

A torque arm, for a dynamometer defining an axis of rotation, having a first, support, end configured for rigid attachment of the arm to the dynamometer, a second, free, end for engaging a reaction stop, a longitudinal axis, an axis intersecting and perpendicular to the longitudinal axis, the axes intersecting and being perpendicular to the axis of rotation when the arm is attached to the dynamometer and a strain gauge for measuring strain of the arm on the transverse axis whereby the strain measurement is a function of torque applied to the arm by an attached dynamometer about an axis of rotation independent of the distance between the axis of rotation and a reaction stop engaging the second end. A dynamometer assembly comprising a dynamometer and such a torque arm attached to a housing of the dynamometer.

17 Claims, 1 Drawing Sheet

DYNAMOMETER TORQUE ARM AND DYNAMOMETER ASSEMBLY

BACKGROUND OF THE INVENTION

This invention relates to a dynamometer torque arm capable of measuring torque supplied by a dynamometer without recalibration with changes in the distance between center of rotation of the dynamometer and the reaction support of the torque and to a dynamometer assembly including a torque arm for measuring torque, horse power and/or rpm of engines particularly, although not exclusively, to engines without removal from an associated vehicle such as snowmobiles, motorcycles, chain saws, and lawn mowers. More particularly the invention provides an easily portable form of such a dynamometer assembly.

Dynamometers typically utilize a water brake to measure the torque of a rotary power source such as an internal combustion engine, with the torque being calculated from the reaction force necessary to hold a torque arm stationary at a fixed predetermined distance from the center of rotation of the water brake with the torque arm itself being affixed to the housing of the water brake. Such an arrangement is quite satisfactory in permanent installations but does not lend itself to universal portable dynamometers in which the dynamometer will be used in a number of different applications, perhaps with an internal combustion engine remaining installed in a vehicle while being tested by the dynamometer in which the distance from the center of rotation of the water brake to the reaction support point will be determined by the structural layout of the vehicle and the engine concerned and will in all probability vary from application to application with the consequent need or desire to recalibrate the dynamometer with each change in that distance if accurate readings are to be achieved.

It is an object of the present invention to provide a torque arm for a dynamometer capable of providing an accurate reading of torque without recalibration over a significant range of distances between torque center and reaction support for the torque arm.

It is a further object of the present invention to provide a dynamometer assembly including a torque arm according to the invention which is readily transportable and suitable for use to ascertain the torque and the horse power of an engine or motor mounted in the equipment in which its operation is associated.

SUMMARY OF THE INVENTION

According to the invention there is provided a torque arm, for a dynamometer defining an axis of rotation, having a first, support, end configured for rigid attachment of the arm to the dynamometer, a second, free, end for engaging a reaction stop, a longitudinal axis, an axis intersecting and perpendicular to the longitudinal axis, the axes intersecting and being perpendicular to the axis of rotation when the arm is attached to a said dynamometer and means for measuring strain of the arm on the transverse axis whereby the strain measurement is a function of torque applied to the arm by an attached dynamometer about an axis of rotation independent of the distance between the axis of rotation and a reaction stop engaging the second end.

The invention also comprises the combination of such a torque arm and a dynamometer.

BRIEF DESCRIPTION OF THE DRAWINGS

The invention will now be described, by way of example, with reference to the accompanying drawings in which.

DETAILED DESCRIPTION OF THE INVENTION

Figure 1:
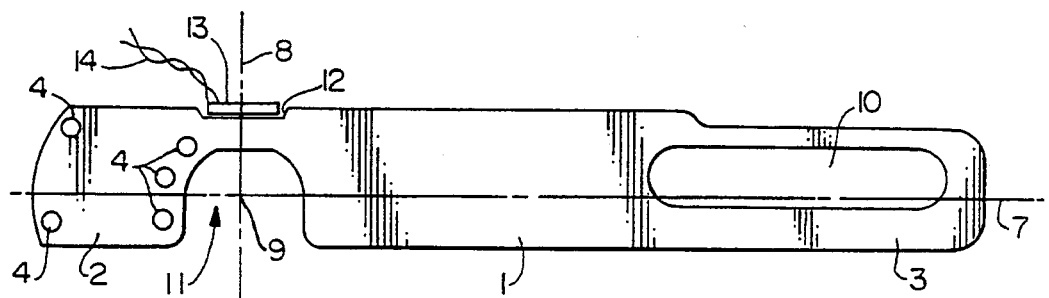
FIG. 1 is a diagrammatic side elevation of one embodiment of a torque arm according to the present invention.

Referring first to FIG. 1 a torque arm 1 has a first, support, end 2 and a second, reaction force receiving, end 3. The first end 2 has five set screw receiving holes 4 by which the torque arm 1 may be mounted rigidly to the housing of a dynamometer 5 by set screws 6 (see FIG. 3). The arm 1 defines a longitudinal axis 7 and a transverse axis 8 intersecting and normal to the longitudinal axis 7. The arm 1 also defines an axis of rotation 9 which is normal to both axes 7 and 8 and which passes through the intersection of those axes.

An elongate opening 10 is formed in the second end 3 of the arm 1 and extends along the arm parallel to the longitudinal axis 7. The opening 10 defines the range of distance for receiving a reaction force to prevent rotation of the torque arm about the axis of rotation 9 and is sized to receive, for example, the transmission shaft of a vehicle to which the dynamometer including the torque arm is attached to measure the torque of an engine of that vehicle.

Adjacent the first end 2 of the arm 1 is a cut out 11 centered on the intersection of the axes 7, 8 and 9 and sized to allow free rotation of the shaft of an engine to which the dynamometer is attack to measure the torque of that engine. Adjacent to cut out 11 is a smaller cut out 12 centered on the transverse axis 8 in which is fixedly attached a strain gauge 13 and the output of which is passed through a connector cable 14.

Figure 2:
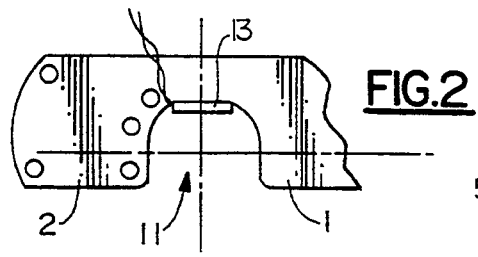
FIG. 2 is a fragmentary diagrammatic side elevation of a second embodiment of a torque arm according to the present invention.

The arm 1 is made of rectangular aluminum bar stock and the cross-section of the arm on the transverse axis 8 is significantly smaller than the cross-section of the rest of the arm 1 whereby when the torque is applied to the arm about the axis of rotation 9 maximum bending will occur at the transverse axis thereby maximizing the measurable strain by the strain gauge. The positioning of the strain gauge on the transverse axis allows the strain gauge to provide an output which is a function of the torque applied to the arm about the axis of rotation 9 which is independent of the distance of the reaction force applied to the opening 10 from the axis of rotation 9. As a result, calibration of the torque arm to provide torque measurement is independent of the distance from the axis of rotation to the reaction force applied to the arm in the opening 10. Substantially insignificant variation in strain gauge output occurs with changes in the position of application of the reaction force and this variation can be minimized by placing the strain gauge as close as possible to the axis of rotation 9, for example, strain gauge may be placed inside of the cut out 11 shown in FIG. 2. The orientation of the arm is chosen, in the preferred embodiment, to place the strain gauge in tension, and to space the strain gauge from the axis of rotation 9 along the transverse axis 8 a distance no more than 15% of the minimum distance between the axis of rotation and the reaction force.

Figure 3:
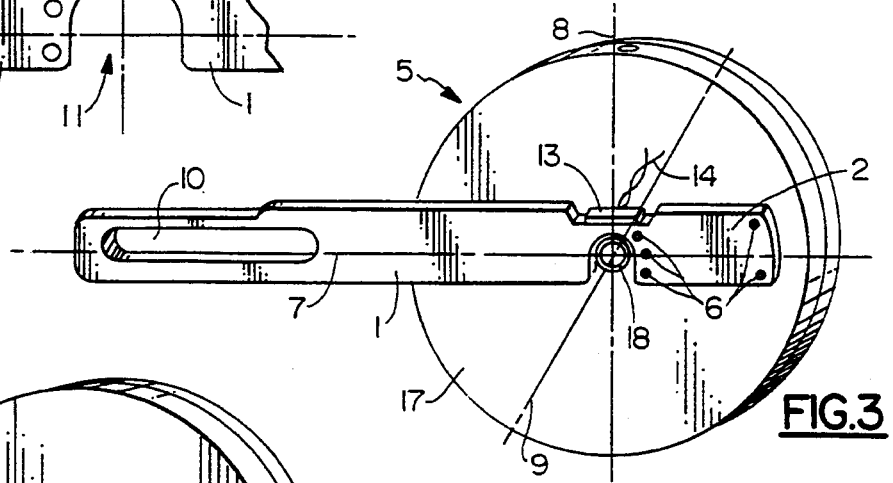
FIG. 3 is a rear view of a dynamometer assembly according to the present invention.
Figure 4:
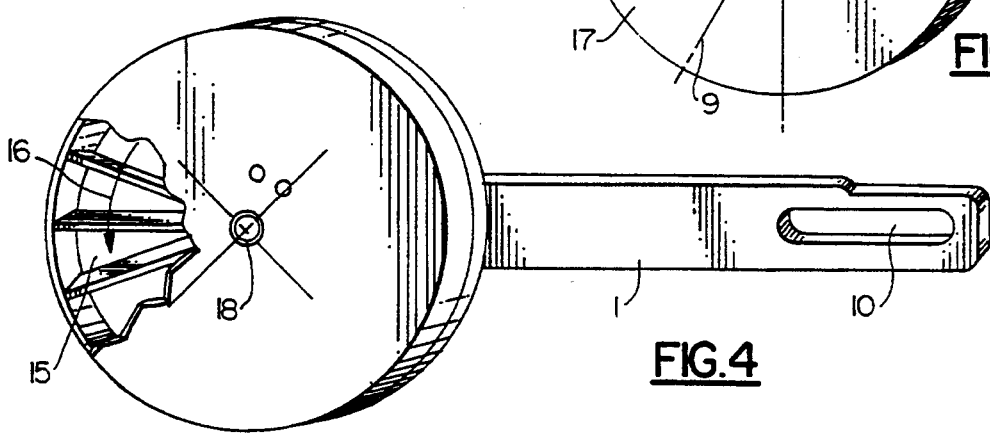
FIG. 4 is a partially broken away front elevation of the dynamometer assembly shown in FIG. 3.

In FIGS. 3 and 4 the torque arm 1 is shown rigidly attached to the housing of the dynamometer 5 by set screws 6. The dynamometer 5 is a conventional water brake dynamometer in which a radially bladed rotor 15 may be attached to the output shaft of an engine, for example, an internal combustion engine of a snowmobile, to be rotated in the direction of arrow 16 with the rotor resisting the rotation of the engine as a result of the passage of the veins through water in the housing 17 of the dynamometer. This resistance to rotation applies a torque to the housing 17 which is passed through the mounting set screws 6 to the arm 1 to apply a torque to the arm 1 representing the torque generated by the engine and the torque is measured by the bending of the torque arm at the location of the strain gauge when a reaction force is applied to the opening 10 to prevent rotation of the arm 1. The shaft 18 to which the rotor 15 is rigidly attached is configured for rigid attachment to and for rotation by the output shaft of the engine concerned. Of course, adapters may be provided to allow attachment to different engine shaft configurations.

Figure 5:
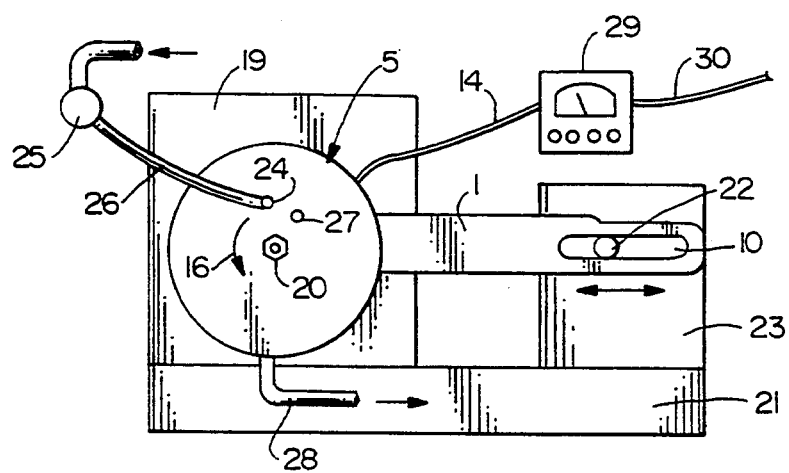
FIG. 5 is a diagrammatic representation of the dynamometer assembly shown in FIGS. 3 and 4 connected to an engine mounted in a vehicle to measure torque, horse power and rpm.

FIG. 5 shows a dynamometer 5 with its torque arm 1 attached to an engine 19 by a nut 20 which supports the dynamometer on the output shaft of the engine. The engine 19 is mounted in the chassis 21 of a vehicle, for example, a snowmobile, and a torque reaction force is applied to the opening 10 of the arm 1 by the input shaft 22 of a transmission 23. Water is supplied to an inlet 24 by way of a flow control valve 25 and a hose 26. The valve 25 is manually adjustable to control the rate of flow of water to the inlet 24, and thereby control the amount of water retained in the dynamometer and thus the resistance to rotation of the rotor 15. Spaced circumferentially in a direction opposite to the direction of rotation of the rotor 15 is a vent opening 27. Both the inlet 24 and vent 27 are placed closely adjacent the axis of rotation of the dynamometer. An outlet 28 allows water to leave the dynamometer 5. The size of the outlet 28 is chosen to regulate the amount of water retained in the dynamometer under the control of the valve 25. Cable 14 extends to a computer 29 to supply information representing the torque applied to the arm by the rotor 15 acting through the housing 17. A further input 30 supplies the computer 29 with information concerning the rpm of the engine 19 so that the computer can calculate horse power as well as provide an output representing torque and/or rpm.

The cut out 11 is placed closely adjacent the first end 2 and the first end 2 is spaced by spacer means from the housing 17 in order to ensure that the remainder of the arm is free to move relative to the housing without any interference between the housing and the arm. Spacer means may conveniently be washers about the set screws 6.

I claim:

1. A torque arm, for a dynamometer defining an axis of rotation, comprising an elongate arm having a support end for rigidly attaching the arm to the dynamometer, a free end for engaging a reaction stop, a longitudinal axis, a transverse axis intersecting and perpendicular to the longitudinal axis, the axes intersecting and being perpendicular to the axis of rotation when the arm is attached to the dynamometer, and strain measuring means for measuring strain of the arm at and normal to the transverse axis whereby strain measurement is a function of torque applied to the arm about the axis of rotation independent of the distance between the axis of rotation and a reaction stop engaging the free end.

2. A torque arm according to claim 1 wherein the strain measuring means is a strain gauge fast with the elongate arm.

3. A torque arm according to claim 1 wherein the strain measurement is at a location on the arm offset from the axis of rotation along the transverse axis by no more than about 15% of the distance between the axis of rotation and the reaction stop when engaging the free end.

4. A dynamometer assembly comprising a dynamometer and a torque arm according to claim 3 attached to a housing of the dynamometer.

5. A torque arm according to claim 1 wherein the free end defines a slot extending along the longitudinal axis defining a permitted range of positions for engagement of the reaction stop with the arm.

6. A torque arm according to claim 5 wherein said permitted range of positions for engagement of the reaction stop with the arm defining at least a minimum distance from the axis of rotation to the reaction stop, said strain measurement is at a location on the arm offset from the axis of rotation along the transverse axis by no more than about 15% of said minimum distance.

7. A torque arm according to claim 1 having a region of reduced cross-section at the location of strain measurement to provide greater flexure of the arm at this means relative to the rest of the arm.

8. A torque arm according to claim 7 wherein the region of reduced cross-section is a first cut out for providing a clearance for a boss, of the attached dynamometer, rotating about the axis of rotation and for minimizing offset of the strain measurement from the axis of rotation along the transverse axis.

9. A dynamometer assembly comprising a dynamometer and a torque arm according to claim 7 attached to a housing of the dynamometer.

10. A torque arm according to claim 8 wherein the strain measuring means is a strain gauge fast with the elongate arm and located at a location on the arm under tension when torque is applied to the arm.

11. A torque arm according to claim 10 wherein the strain gauge is located in a second cut out adjacent said first cut-out.

12. A torque arm according to claim 10 wherein the strain gauge is located in said first cut out.

13. A dynamometer assembly comprising a dynamometer and a torque arm according to claim 10 attached to a housing of the dynamometer.

14. A dynamometer assembly comprising a dynamometer and a torque arm according to claim 1 attached to a housing of the dynamometer.

15. A dynamometer assembly according to claim 14 wherein the dynamometer is a water brake.

16. A dynamometer assembly according to claim 15 wherein the assembly comprises means for controlling and varying flow of water to the dynamometer, a water outlet from the dynamometer, means for measuring rpm of the dynamometer about the axis of rotation, computing means for receiving an output representing applied torque from the means for measuring strain and an output from the means for measuring rpm representing rpm and for providing outputs of at least one of torque, and horsepower.

17. A torque arm, for a dynamometer defining an axis of rotation, comprising a reaction arm having a support end for rigidly attaching the arm to the dynamometer, a free end for engaging a reaction stop, a longitudinal axis, a transverse axis intersecting and perpendicular to the longitudinal axis, the axes intersecting and being perpendicular to the axis of rotation when the arm is attached to the dynamometer, and strain measuring means on the arm for measuring strain of the arm along an edge thereof parallel to the longitudinal axis and normal to the transverse axis whereby strain measurement is a function of torque applied to the arm about the axis of rotation independent of the distance between the axis of rotation and a reaction stop engaging the second end.

* * * * *